United States Patent
Saunders et al.

(10) Patent No.: US 9,199,586 B2
(45) Date of Patent: Dec. 1, 2015

(54) SLOTTED GROMMET AND ASSEMBLY

(75) Inventors: Robert H. Saunders, Oak Park, MI (US); Ha To Chung, Canton, MI (US); Robert J. Mohan, Canton, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 171 days.

(21) Appl. No.: 13/346,017

(22) Filed: Jan. 9, 2012

(65) Prior Publication Data

US 2013/0177349 A1    Jul. 11, 2013

(51) Int. Cl.
*F02M 35/10* (2006.01)
*B60R 16/02* (2006.01)
*F16B 21/09* (2006.01)
*F16B 5/06* (2006.01)

(52) U.S. Cl.
CPC .............. *B60R 16/0222* (2013.01); *F16B 21/09* (2013.01); *F16B 5/065* (2013.01); *Y10T 16/063* (2015.01); *Y10T 29/49826* (2015.01); *Y10T 403/52* (2015.01)

(58) Field of Classification Search
CPC ...................... F02M 35/10091; F02M 35/0204
USPC ......... 403/188, 194, 197, 201, 240, 243, 263, 403/388, 397, 353; 16/2.1, 2.5; 24/522, 24/526, 669, 702
See application file for complete search history.

(56) References Cited

U.S. PATENT DOCUMENTS

| | | | | |
|---|---|---|---|---|
| 1,384,565 | A * | 7/1921 | Martin | 16/2.1 |
| 2,225,472 | A * | 12/1940 | Franklin | 403/197 |
| 2,318,853 | A * | 5/1943 | Hall | 403/188 |
| 5,010,781 | A * | 4/1991 | Kirk et al. | 403/197 |
| 5,233,881 | A * | 8/1993 | Sayen et al. | 74/502.4 |
| 5,716,154 | A * | 2/1998 | Miller et al. | 403/353 |
| 5,788,314 | A * | 8/1998 | Hayes et al. | 296/63 |
| 5,890,831 | A * | 4/1999 | Kato | 403/329 |
| 6,088,874 | A * | 7/2000 | Nakata et al. | 16/2.1 |
| 6,092,436 | A * | 7/2000 | Wirsing et al. | 403/353 |
| 6,147,307 | A * | 11/2000 | Ling et al. | 16/2.1 |
| 6,179,360 | B1 | 1/2001 | Davian | |
| 6,591,466 | B1 * | 7/2003 | Acton et al. | 27/10 |
| 2005/0191123 | A1 * | 9/2005 | Wertz et al. | 403/353 |

FOREIGN PATENT DOCUMENTS

JP    6-229486    *  8/1994  ...................... 16/2.1

* cited by examiner

*Primary Examiner* — Michael P Ferguson
(74) *Attorney, Agent, or Firm* — James Dottavio; MacMillan, Sobanski & Todd, LLC

(57) ABSTRACT

A grommet for securing a tube includes an oval hole having a wide portion and a narrow portion, a recess located between upper and lower shoulders surrounding the hole, an inclined surface to guide the grommet into a mounting hole, and a lower surface that can be engaged by a connector on the tube.

9 Claims, 3 Drawing Sheets

SLOTTED GROMMET AND ASSEMBLY

BACKGROUND OF THE INVENTION

1. Field of the Invention

This invention relates generally to an apparatus for securing a connector to a mounting surface, more particularly to facilitating installation and preventing inadvertent movement of the connected component.

2. Description of the Prior Art

In a motor vehicle a clean air tube must be secured to a mounting bracket having a hole into which a connector on the tube is inserted. If the hole were circular and sized to conform to the size of the tube connector, the force required to insert the connector into to the grommet hole is excessively high, exceeding relevant standards.

A need exists in the industry for a technique that permits installation of the tube connector into a grommet hole with a relative low force and retention of the connector in the grommet such that the tube cannot move vertically relative to the mounting surface while retained in the grommet nor laterally except intentionally.

SUMMARY OF THE INVENTION

A grommet for securing a tube includes an oval hole having a wide portion and a narrow portion, a recess located between upper and lower shoulders surrounding the hole, an inclined surface to guide the grommet into a mounting hole, and a lower surface that can be engaged by a connector on the tube.

The larger portion of the grommet's hole permits a tube connector to be easily inserted with relatively low force. The small portion of the grommet's hole retains the tube in position in the mounting hole with sufficient retention force to prevent inadvertent lateral and vertical movement of the tube.

The rubber grommet dampens vibrations and permits easy disassembly of the tube from the grommet and mounting hole.

The scope of applicability of the preferred embodiment will become apparent from the following detailed description, claims and drawings. It should be understood, that the description and specific examples, although indicating preferred embodiments of the invention, are given by way of illustration only. Various changes and modifications to the described embodiments and examples will become apparent to those skilled in the art.

DESCRIPTION OF THE DRAWINGS

The invention will be more readily understood by reference to the following description, taken with the accompanying drawings, in which.

DESCRIPTION OF THE PREFERRED EMBODIMENT

Figure 1:
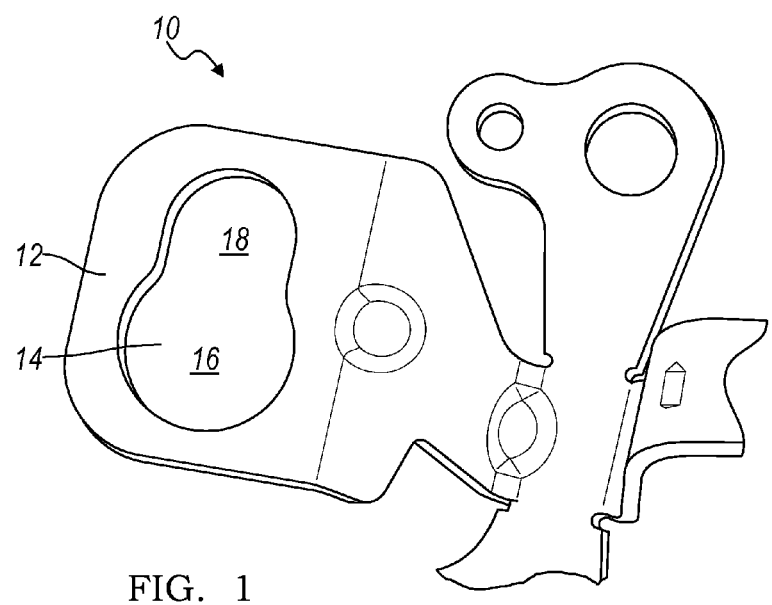
FIG. 1 is an isometric view of a mounting bracket.

Referring now to FIG. 1 a bracket 10, preferably of metal, includes a mounting surface 12 formed with an oval hole 14 having a wide portion 16 and a narrow portion 18.

Figure 2:
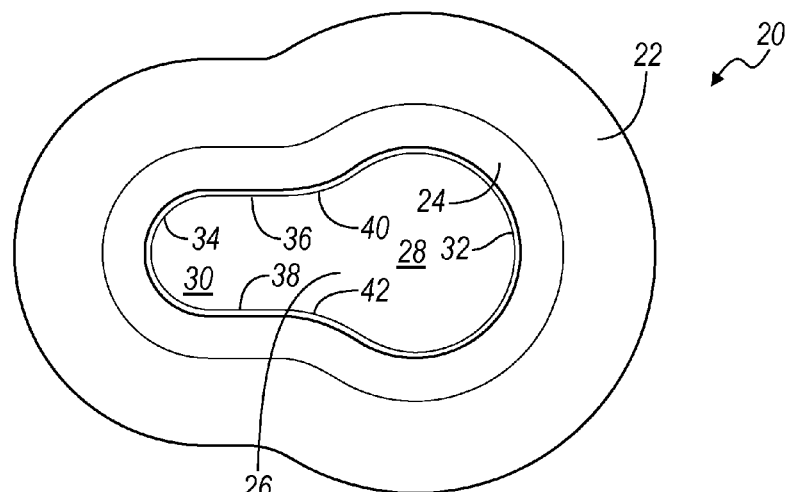
FIG. 2 is a top view of a grommet that can be inserted in to the bracket of FIG. 1.

FIG. 2 is a top view of a grommet 20, preferably of ethylene propylene diene monomer (EPDM), a type of synthetic rubber. Grommet 20 has an upper surface 22, and an inclined surface 24, which surrounds an oval hole 26 for guiding a connector into the grommet. Oval hole 26 has a wide portion 28 and a narrow portion 30. A portion of the periphery of the wide portion 28 has the form of a larger circular arc 32. A portion of the periphery of the narrow portion 30 has the form of a smaller circular arc 34. Hole 26 also includes parallel longitudinal surfaces 36, 38 extending between the arcs 32, 34, and radii 40, 42, which blend the contours of the larger arc 32 into surfaces 36, 38. The parallel longitudinal surfaces 36, 38 define a longitudinal channel that extends from the narrow portion 30 toward the wide portion 28 of the grommet hole 26.

Figure 3:
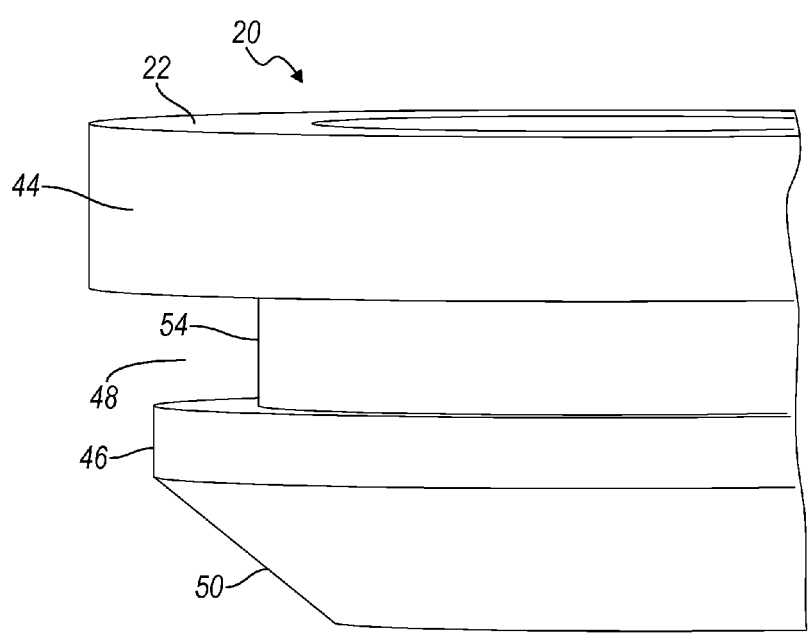
FIG. 3 is a side view of a portion of the grommet of FIG. 2.

As FIG. 3 shows, the outer surface of the grommet 20 wall is formed with an upper cylindrical shoulder 44; a lower shoulder 46; a recess 48, located between shoulders 44, 46; an inclined surface 50, which guides grommet into hole 16 of the bracket 10; and a lower surface 52. When grommet 10 is seated in hole 16, the mounting surface 12 is fitted in recess 48. The contour 54 of recess 48 is similar to that of the contour of the bracket hole 14, i.e., having a wide portion and a narrow portion. Preferably the contour 54 of recess 48 is slightly larger than the contour of bracket hole 14 so that recess 48 is engaged elastically with an interference fit against hole 14.

Figure 4:
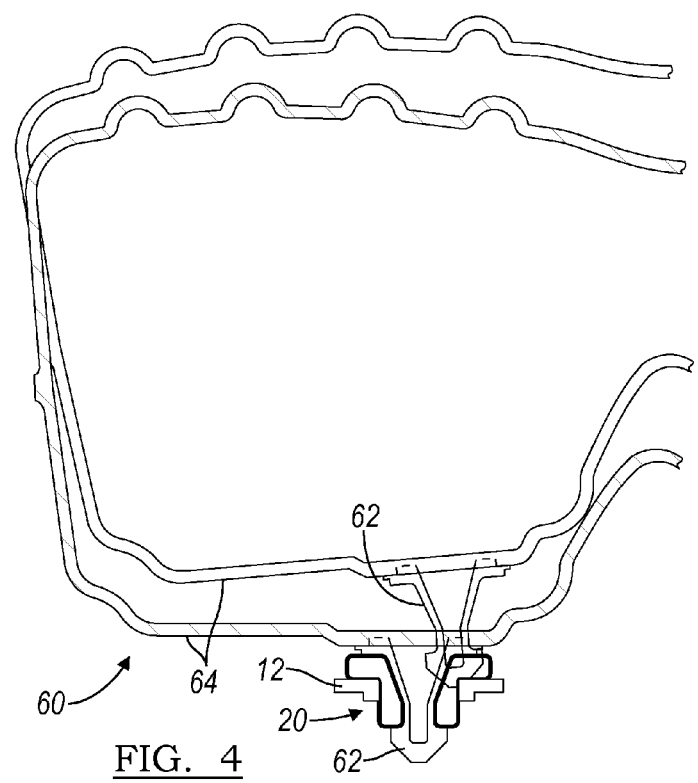
FIG. 4 is a cross sectional view through the wall of a tube showing a connector on the tube approaching and engaging the installed grommet.
Figure 5:
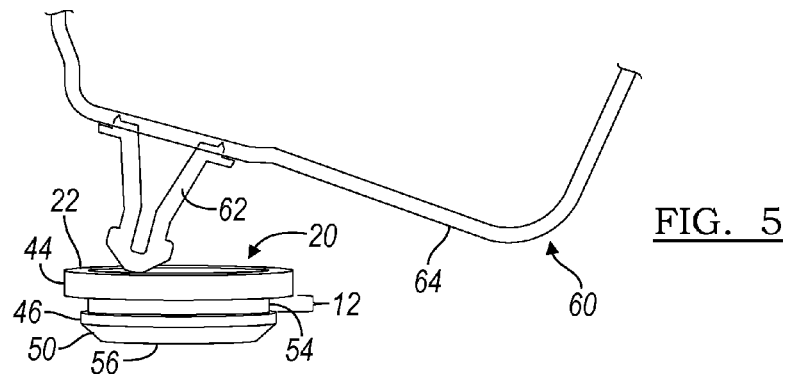
FIG. 5 is side view showing the tube connector of FIG. 4 located above the wide portion of the grommet and mounting surface.
Figure 6:
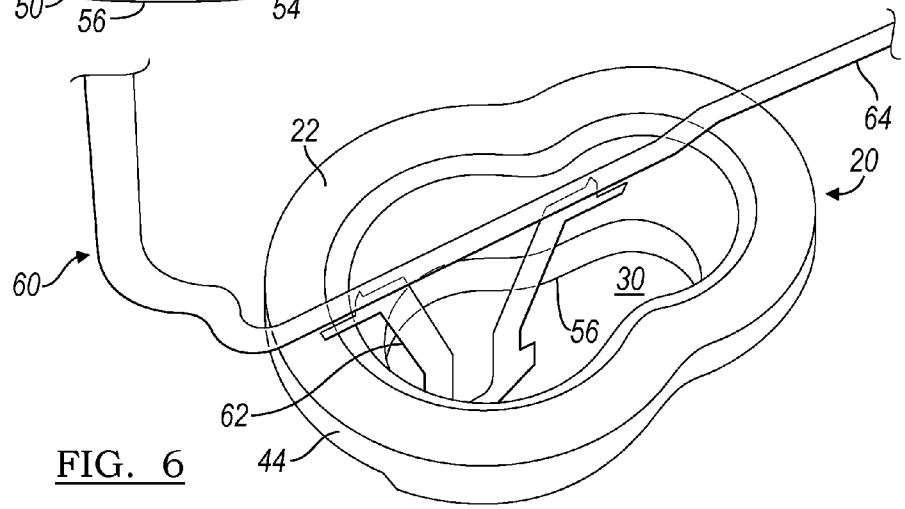
FIG. 6 is a perspective top view showing the tube connector of FIG. 4 having been inserted into the wide portion of the grommet and mounting surface.
Figure 7:
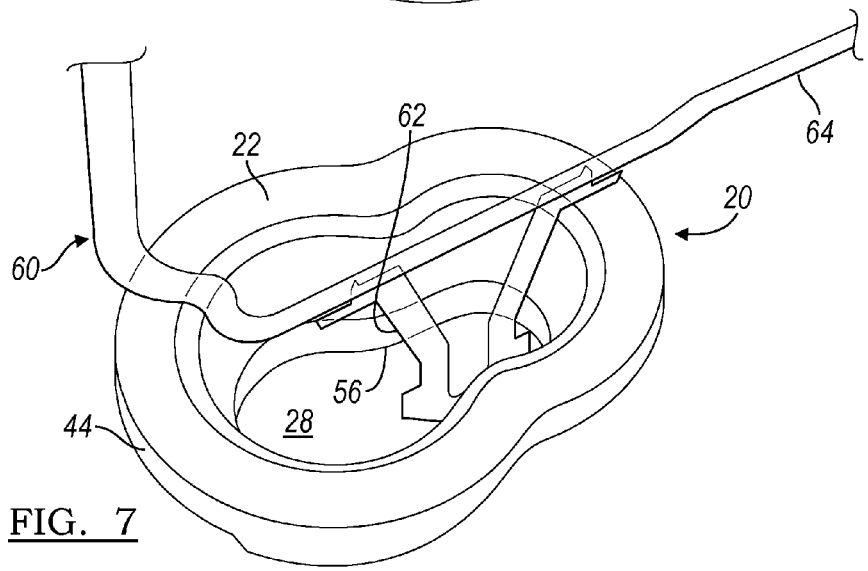
FIG. 7 is a perspective top view showing the tube connector of FIG. 4 having been displaced from the wide portion into the narrow portion of the grommet and mounting surface.

Referring to FIG. 4, a tube 60 is connected to bracket 10, in which grommet 20 is installed. FIGS. 5-7 shows the steps for connecting the tube 60 to bracket 10 through grommet 20. Tube 60 includes a connector 62 (sometimes referred to as a turkey foot) secured to the tube 60 and extending toward grommet 20 from an outer surface 64 of the tube. Tube 60 is maneuvered into position, preferably by a human assembler or operator, who aligns the turkey foot connector 62 with the wider portion 28 of the grommet's oval hole 26 and the wide portion 16 of the hole 14 in mounting surface 12. When tube 60 is so aligned, the assembler pushes the turkey foot connector 62 downward into the wider portion 28 of grommet 20 and the wide portion 16 of the hole 14. The assembler then slides the turkey foot connector 62 along the parallel longitudinal surfaces 36, 38 of hole 26 into the narrow portion 30 of the oval hole 26. The turkey foot connector 62 elastically engages the grommet's lower surface 56, thereby preventing its removal upward through the narrow portion 30 of oval hole 26.

When the turkey foot connector 62 is located in the narrow portion 30 of the grommet hole 26, the tube is prevented from move upward, downward or laterally. It can't move backward because the clean air tube 60 is secured by a worm gear clamp.

In accordance with the provisions of the patent statutes, the preferred embodiment has been described. However, it should be noted that the alternate embodiments can be practiced otherwise than as specifically illustrated and described.

The invention claimed is:

1. A tube connection, comprising:
  a bracket including a mounting surface having an oval hole extending therethrough having a first end that forms a wide portion and an opposed second end that forms a narrow portion;
  a circumferentially continuous and elastically flexible grommet including an oval hole axially extending therethrough having a periphery parallel to a periphery of the bracket hole and including a first end that forms a wide portion and an opposed second end forming a narrow portion, and a circumferentially continuous recess extending around an outer periphery of the grommet and fitted into and having a contour that conforms to the periphery of the bracket hole, the recess defining a lower shoulder pressed against a first side of the mounting surface, and an upper shoulder pressed against a second opposite side of the mounting surface; and
  a vehicle air tube including a connector projecting outwardly from an outer surface thereof, the connector comprising a clip having opposing legs and a foot at a distal end thereof, the legs and foot being narrower than the wide portion of the grommet hole, the legs of the clip being inserted through the wide portion of the grommet hole and being moved into the narrow portion of the grommet such that the foot of the clip is elastically engaged with a lower surface of the lower shoulder of the grommet for vertical and lateral retention of the tube.

2. The tube connection of claim 1, wherein the grommet further comprises a tapering inclined surface having a corresponding shape to a periphery of the bracket hole and configured to flex inwardly toward the bracket hole during insertion of the grommet into the bracket hole.

3. The tube connection of claim 2, wherein the
  lower shoulder is disposed between the inclined surface and the first side of the mounting surface, and the lower shoulder extends around the entire periphery of the bracket hole; and
  wherein the upper shoulder extends around the entire periphery of the bracket hole.

4. The tube connection of claim 1, wherein:
  a portion of a periphery of the wide portion of the grommet hole includes a larger arc;
  a portion of a periphery of the narrow portion of the grommet hole includes a smaller arc; and
  a portion of a periphery of the grommet hole includes longitudinal surfaces directed from the smaller arc toward the larger arc, and radii that blend the larger arc into the longitudinal surfaces.

5. The tube connection of claim 4, wherein the arcs are circular arcs.

6. A method for securing a tube, comprising:
  providing a bracket including a mounting surface having an oval hole extending therethrough having a first end that forms a wide portion and an opposed second end that forms a narrow portion;
  fitting a circumferentially continuous grommet into the mounting surface hole by elastically flexing the grommet such that a grommet recess extending around an outer periphery of the grommet fits within the mounting surface hole, the grommet recess having a contour that conforms to a periphery of the bracket hole, the grommet including an oval hole axially extending therethrough having a periphery parallel to a periphery of the mounting surface hole and including a first end that forms a wide portion and an opposed second end forming a narrow portion, the recess defining a lower shoulder pressed against a first side of the mounting surface, and an upper shoulder pressed against a second opposite side of the mounting surface;
  inserting a tube connector projecting outwardly from an outer surface of a vehicle air tube into the wide portion in the grommet hole, the tube connector comprising a clip having opposing legs and a foot at a distal end thereof, the legs being inserted through and narrower than the wide portion of the grommet hole;
  moving the tube connector from the wide portion of the grommet hole into the narrow portion of the grommet hole, the legs of the tube connector being narrower than the narrow portion of the grommet hole; and
  elastically engaging the foot of the tube connector with a lower surface of the lower shoulder of the grommet for vertical and lateral retention of the connector in the narrow portion of the grommet hole.

7. The method of claim 6, wherein said engaging further includes engaging the tube connector to the grommet such that removal of the tube connector from the grommet hole is resisted by the engagement of the foot of the tube connector to the narrow portion of the grommet hole, the foot of the tube connector being narrower than the wide portion of the grommet hole and wider than the narrow portion of the grommet hole.

8. The method of claim 6, wherein said engaging further includes engaging the tube connector to the grommet such that movement of the tube connector in a direction normal to the mounting surface is resisted by the engagement of the foot of the tube connector to the lower surface of the lower shoulder of the grommet hole, the foot of the tube connector being narrower than the wide portion of the grommet hole and wider than the narrow portion of the grommet hole.

9. The method of claim 6, wherein said engaging further includes engaging the tube connector to the grommet such that movement of the tube connector in a plane of the mounting surface is resisted by the engagement of the tube connector to peripheral sides of the narrow portion of the grommet hole.

* * * * *